United States Patent [19]
Fink

[11] 3,811,145
[45] May 21, 1974

[54] UNIVERSAL HOLDER FOR THREAD CUTTING DIES

[76] Inventor: Wilfried Fink, 6250 Diez, Auweg 2, Germany

[22] Filed: June 8, 1972

[21] Appl. No.: 261,071

[30] Foreign Application Priority Data
June 9, 1971  Germany............................ 2128676

[52] U.S. Cl. ............................................. 10/123 P
[51] Int. Cl. .......................... B23g 1/26, B23g 5/04
[58] Field of Search ... 10/107, 123 R, 123 P, 123 S; 408/239, 240

[56] References Cited
UNITED STATES PATENTS
| | | | |
|---|---|---|---|
| 250,801 | 12/1881 | Gardner | 10/123 R |
| 1,404,546 | 1/1922 | Roeder | 10/123 R |
| 1,436,368 | 11/1922 | Thomas | 10/123 R |
| 1,436,369 | 11/1922 | Thomas | 10/123 R |
| 1,448,030 | 3/1923 | Lesslie | 10/123 R |
| 1,450,211 | 4/1923 | Kopp | 10/123 R |
| 1,549,685 | 8/1925 | Rizza | 10/123 R |

FOREIGN PATENTS OR APPLICATIONS
| | | | |
|---|---|---|---|
| 37,353 | 4/1927 | Denmark | 10/123 R |

*Primary Examiner*—Charles W. Lanham
*Assistant Examiner*—E. M. Combs

[57] ABSTRACT

A universal thread cutting die holder comprises a body having an opening to individually accept a number of different thread cutting dies each of which is intended for a pipe, or rod, of a different diameter, with a positioning device having a pair of jaws to grip each die when accepted in the opening, and also including a universal guide having different correspondingly sized openings to concentrically align the respective dies with the object to be threaded.

10 Claims, 8 Drawing Figures

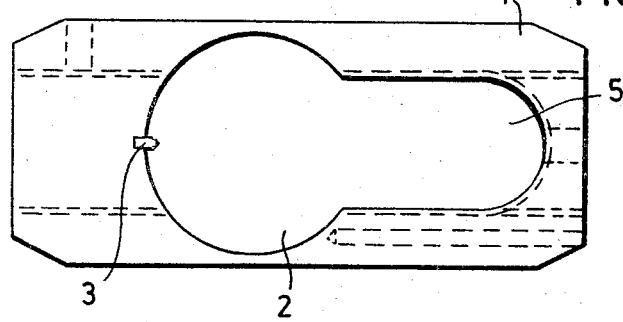
FIG.1
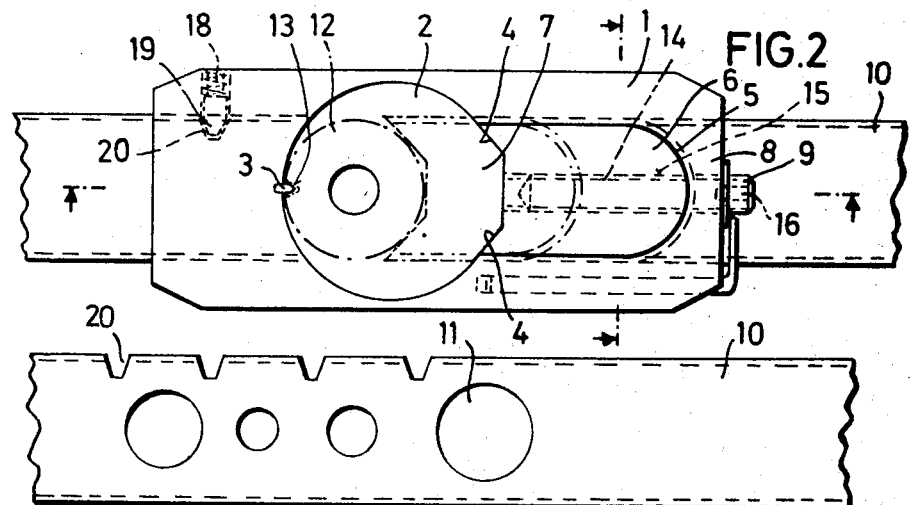
FIG.2
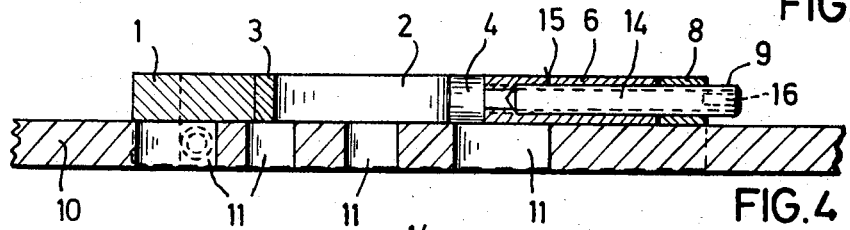
FIG.3
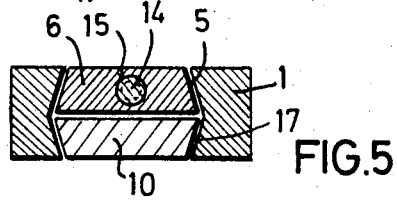
FIG.4
FIG.5

UNIVERSAL HOLDER FOR THREAD CUTTING DIES

Holders for thread cutting dies are known, which consist of a round holder with exchangeable taper sleeves, or chuck collets. The outside diameter of each of the taper sleeves corresponds to the inside diameter of the receiving aperture in the holder into which it is inserted. The inside diameter of each of these taper sleeves corresponds to the outside diameter of the die that is to be inserted and then screwed tightly into the sleeve. The disadvantage of these die holders is that various inserts are needed for dies with different outside diameters and there are always several set screws that must be tightened to keep the dies in place.

It is an object of the present invention to provide a die holder into which dies having various outside diameters can be inserted without there being any need for taper sleeves and assorted set screws to be tightened.

This object is achieved essentially by a holder for thread cutting dies which consists of a generally elongated body with preferably a circular opening therethrough, the diameter of which preferably corresponds to the outside diameter of the largest die customarily used, with a projection on the inside periphery of the opening that engages with a complementary notch on the outside periphery of the respective dies, and with two adjustable jaws shaftable into the opening and disposed on the side thereof opposite the projection.

When a thread is to be cut, the corresponding die is inserted in the opening and the holding jaws are shifted into abutment with the outside peripheral surface of the die and then fixed. No taper sleeves whatever are needed and set screws do not have to be tightened.

With the known die holders it is only with great difficulty that it is possible to cut a thread that is concentric to the axis of the pipe, or bar, on which the thread is placed. Therefore, it is another object of the invention to provide a die holder with which a thread concentric to the axis of various diameters of pipes, or bars, can be cut. This object is achieved by the incorporation of a guide element which is adjustably disposed on the body of the holder, which guide element is provided with several bores of different diameters, the axes of these bores lying parallel to the axis of the opening in the body, whereby the bores in the guide element can be brought into concentric alignment with an inserted die having the same inside diameter.

In operation, a die is inserted in the opening in the body which corresponds to the diameter of the object to be cut and the guide element is shifted until the bore whose diameter corresponds to the outside diameter of the object is in alignment with the opening in the die. The guide element is then pushed on to the end of the object until the die is started; then the holder, with the die in place, is rotated to complete the cut. The thread thus produce will be concentric with the axis of the object.

Other characteristics of the invention are disclosed in the following description and claims, in connection with the annexed drawings, which represent several embodiments of the invention without limiting it specifically thereto.

FIG. 1 is a plan view of the body of a preferred form of die holder according to the invention;

FIG. 2 shows the body of FIG. 1 with a die inserted therein, together with a preferred form of guide means;

FIG. 3 is a top view of the guide element for the die holder of FIG. 2;

FIG. 4 is a vertical cross-section through the die holder taken on the line B—B of FIG. 2;

FIG. 5 is a vertical cross-section through the die holder taken on the line A—A of FIG. 2;

Figure 6:
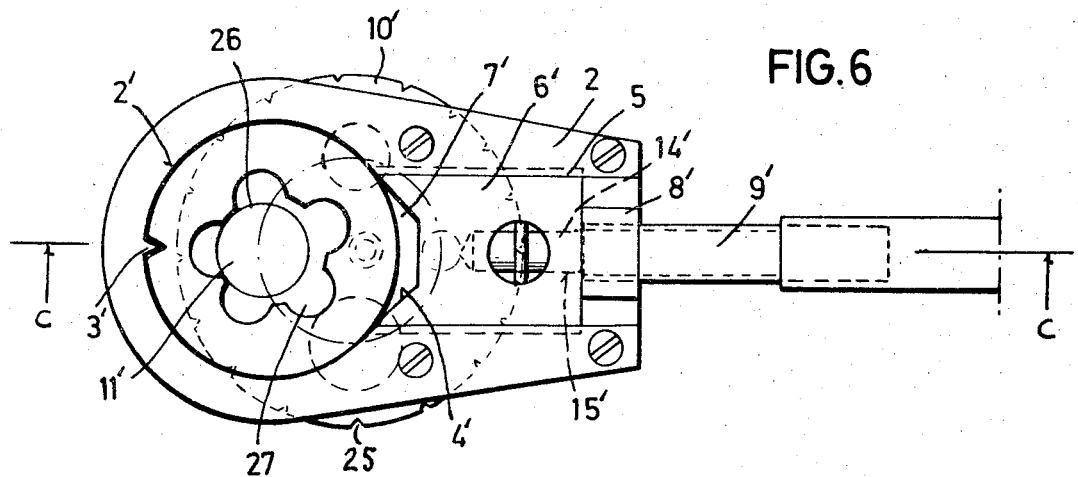
FIG. 6 is a plan view of a modified form of die holder having a rotatable guide element.

In FIGS. 1 through 5, reference numeral 1 designates the body of the die holder provided with a preferably circular opening 2, into which a die, indicated by the numeral 12 (FIG. 2) is inserted. In alignment with the longitudinal axis of the body 1, a projection 3 arranged on the inner peripheral surface of opening 2 engages with a correspondingly shaped notch 13 provided on the die 12. Intersecting the opening 2, opposite to the projection 3, the body is provided with an elongated recess 5, the side walls of which are angularly dovetailed, as shown in FIG. 5, and the center line of recess 5 passes through the center of opening 2 and projection 3. The recess 5 does not extend to the end of body 1, but terminates at the cross member 8. A positioning element 6, having a dovetailed cross-section, is mounted slidably in the recess 5 and the end facing the opening 2 is shaped like an isosceles triangle as at numeral 7, to define a pair of angularly inwardly directed holding jaws 4. The positioning element 6 is adjusted by means of a screw bolt 9 that is mounted rotatably in the cross member 8 of the holder body, said bolt being externally threaded to engage with the internally threaded bore 15 provided in the element 6. Numeral 16 denotes a slot in the free end of bolt 9 into which a screwdriver, or similar device, can be inserted for adjustment.

The guide means for aligning a die concentrically with the object to be threaded includes a guide element 10 which can be longitudinally shifted below the die 12 and positioning element 6 paralel to the axis thereof. The guide element 10 is also longitudinally slidable in another recess 17 in the body 1 located below recess 5 and having side walls which are oppositely dovetailed as compared to the side walls of recess 5. This guide element 10 is provided with a number of bores 11, the axes of which lie parallel to the axis of the opening 2, and the die 12 inserted therein. The diameters of these bores 11 correspond to the outside diameters of standard pipes and bars which are to be threaded. The guide element is held in the proper location by a detent means composed of a spring 18 which presses against a ball 19 disposed laterally in the wall of recess 17. The ball 19 engages in corresponding notches 20 provided in one side wall of guide element 10, which is dovetailed in cross-section to slide longitudinally in recess 17.

When a thread is to be cut, the proper die is inserted in opening 2 and positioning element 6 is shifted into the opening 2 by turning the bolt 9 until the jaws 4 abut against the die. Guide element 10 is also shifted until the corresponding bore is in alignment with die 12. The guide element, with the aligned die, is then pushed on to the end of the rod, or pipe, until the die fits against the end thereof. By turning the entire die holder the thread may then be cut. Because of the presence of the guide element 10, the thread will then be concentric with the axis of pipe, etc. If the thread must be cut flush against a cap, such as in the case of a bolt, then the die holder, after a certain length of thread has been cut, is turned around and reversed with the guide element 10 facing away from the cap. Thus a thread can be cut directly to the cap on the end of the bolt. Obviously, the notches 20 and the position of the recess holding ball 19 must be disposed in such a way that the pertinent bore can be placed in alignment with the pertinent die, and vice versa.

Figure 7:
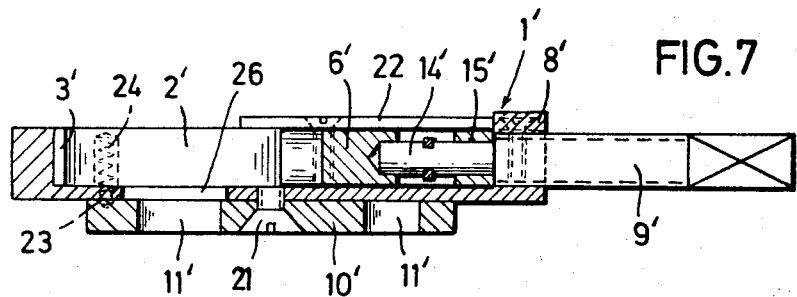
FIG. 7 is a vertical cross-section through the die holder of FIG. 6, taken on the line C—C of FIG. 6.

A modified form of the invention is shown in FIGS. 6 and 7, wherein a die holder with a rotatable guide element is shown. In these figures, reference numeral 1' designates the body having an opening 2' for a die with the projection 3', recess 5', positioning element 6' having the portion 7' carrying the jaws 4'. Reference numeral 8' designates the wall at the end of recess 5' forming the end of the body 1' in which the adjusting bolt 9' is threadedly received, the shaft 14' of which engages in the bore 15'. The free end of bolt 9' is extended to serve as a lever for operating the die holder. Reference numeral 10' designates a modified type of guide means which is circular and provided with bores 11' arcuately arranged around the bolt 21 which rotatably attaches the guide means to the body 1'. In order to prevent element 6' from dropping out of recess 5', the recess is closed by a plate 22. The guide element is fixed by means of a ball 23 and spring 24 which engages with corresponding notches 25 in the guide element.

The opening 2' has a reduced center portion 26 extending through the body 1', the diameter of this portion being such that the customarily largest pipe, on which a thread is to be cut, can be guided through. The portion 26 and the bores 11' can have semi-circular recesses 27 in their own peripheral surfaces in order to facilitate the removal of chips produced during a threading operation.

Figure 8:
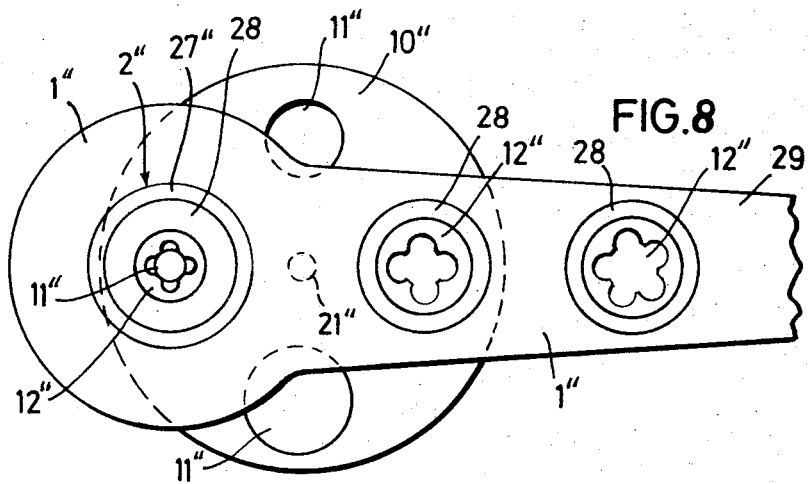
FIG. 8 is a plan view of another modified form of die holder having a ratchet drive means for the dies.

A further modification is shown in FIG. 8, in which reference numeral 1'' designates the body with the opening 2'', into which a conventional one-way ratchet mechanism 27'' is inserted. Numeral 12'' is the die which is inserted into the chuck collet 28, the outside diameter of which corresponds to the inside diameter of ratchet mechanism 27'' and the inside diameter of which corresponds to the outside diameter of the die 12''. The unused dies, inserted into their respective chuck collets 28, can be stored by placement into corresponding recesses in the lever 29 which, together with body 1'' constitutes a single element. Reference numeral 10'' designates the guide element which is rotatably attached to lever 29 by the bolt 21''. Reference numeral 11'' designates the bores in the guide element 10'', and its operation is similar to that of the rotatable guide means 10' of FIGS. 6 and 7.

In place of the above mentioned guide elements, it is possible to use a fixed guide element having a bore corresponding to the diameter of the largest pipe to be threaded; in the case of smaller pipes there may be inserted into this bore various sized chuck collets; and these collets can also be stored in other recesses provided in the lever 29.

I claim:

1. Universal holder for a plurality of circular thread cutting dies, each of which dies has a different outside diameter, comprising an elongated body provided with a circular opening extending therethrough having a diameter at least as large as the outside diameter of the largest one of said dies in order to operatively accept any one of said dies in said opening, adjustable positioning means for securing any one of said dies in said operatively accepted position, said positioning means including an inwardly directed projection in said opening and jaw means mounted on said body for movement toward and away from said projection, said jaw means having two spaced angularly related surfaces to combine with said projection to hold any one of the dies in three-point engagement, and adjustable guide means provided with a plurality of openings each corresponding to the diameter of an object to be threaded by a particular one of said dies, said guide means being movably attached to said body to position each of said openings in the guide means in concentric alignment with the corresponding particular die.

2. Universal holder for a plurality of circular thread cutting dies, each of which dies has a different outside diameter, comprising an elongated body provided with a circular opening extending therethrough having a diameter at least as large as the outside diameter of the largest one of said dies in order to operatively accept any one of said dies in said opening, and adjustable positioning means for securing any one of said dies in said operatively accepted position comprising a radially inwardly directed projection in said opening for engagement with a complementary notch provided in the periphery of each of said dies, jaw means mounted on said body diametrically spaced from said projection for movement generally radially of said opening and provided with angularly convergent jaw surfaces facing said projection to engage with a die means at peripherally spaced points opposite said projection for three-point suspension of any one of said dies, and guide means to locate a die held by the positioning means in alignment with an article to be threaded.

3. The invention defined in claim 2, wherein said body is provided with an elongated recess radially intersecting said opening at one end having dovetailed parallel side walls, and said jaw means includes an element having dovetailed side walls complementary to the walls of said recess and slidable therein, the portion of said element facing the opening being provided with a pair of angularly related spaced surfaces to abut against the exterior periphery of a die accepted in said opening.

4. The invention defined in claim 3, wherein said body also includes guide means comprising a second element provided with a plurality of openings each corresponding to the diameter of an object to be threaded by a particular one of said dies, said second element being movably attached to said body to position each of said openings in the second element in concentric alignment with the corresponding particular die.

5. The invention defined in claim 4, wherein said second element is attached to said body for rotation with respect thereto, said openings in the guide means being arranged arcuately with respect to the axis of said rotation.

6. The invention defined in claim 4, wherein said second element is attached to said body for slidable movement in a direction which intersects the center of a die accepted in said opening in the body, the centers of the openings in the guide means being in alignment with said direction of movement.

7. The invention defined in claim 6, wherein said recess provided in said body is provided with a second pair of dovetailed parallel side walls, and said second element is provided with dovetailed side walls complementary to the second pair of side walls of said recess.

8. The invention defined in claim 1, wherein said circular opening in said elongated body includes one-way ratchet means to operatively accept any one of said dies.

9. The invention defined in claim 1, wherein said circular opening in said elongated body includes means to operatively accept any one of said dies combined with a corresponding ring-shaped one-way ratchet drive means.

10. The invention defined in claim 1, wherein said adjustable guide comprises a fixed element having an opening positioned in alignment with the opening in said elongated body and a plurality of chuck collets to be individually received in the opening in the fixed element, each of which chuck collets has an inside diameter corresponding to the diameter of an article to be threaded.

* * * * *